United States Patent
Keisala et al.

(10) Patent No.: US 9,730,061 B2
(45) Date of Patent: Aug. 8, 2017

(54) NETWORK AUTHENTICATION

(71) Applicant: TeliaSonera AB, Stockholm (SE)

(72) Inventors: Ilkka Keisala, Espoo (FI); Joni Rapanen, Espoo (FI)

(73) Assignee: Telia Company AB, Stockholm (SE)

( * ) Notice: Subject to any disclaimer, the term of this patent is extended or adjusted under 35 U.S.C. 154(b) by 20 days.

(21) Appl. No.: 14/667,195

(22) Filed: Mar. 24, 2015

(65) Prior Publication Data
US 2015/0281960 A1 Oct. 1, 2015

(30) Foreign Application Priority Data

Mar. 25, 2014 (EP) .................................... 14161596

(51) Int. Cl.
H04L 29/06 (2006.01)
H04W 12/06 (2009.01)
H04W 12/08 (2009.01)
H04W 8/18 (2009.01)
H04W 88/06 (2009.01)
H04W 84/12 (2009.01)

(52) U.S. Cl.
CPC ........... *H04W 12/06* (2013.01); *H04W 8/183* (2013.01); *H04W 12/08* (2013.01); *H04L 63/0853* (2013.01); *H04L 63/162* (2013.01); *H04L 63/18* (2013.01); *H04W 84/12* (2013.01); *H04W 88/06* (2013.01)

(58) Field of Classification Search
CPC ... H04L 63/0892; H04L 63/18; H04L 63/163; H04L 63/10; H04L 65/1016; H04W 12/06; H04W 88/06; H04W 12/08; H04W 84/12

USPC ............................................................ 726/7
See application file for complete search history.

(56) References Cited

U.S. PATENT DOCUMENTS 8,441,995 B2 * 5/2013 Xi ..................... H04L 29/12188
370/329
2007/0281687 A1 * 12/2007 Jiang ...................... H04W 8/20
455/433

(Continued)

FOREIGN PATENT DOCUMENTS

EP 2445242 A1 4/2012
WO 9600485 A2 1/1996

(Continued)

OTHER PUBLICATIONS

EP Search Report, dated Jul. 4, 2014, from corresponding EP application.

*Primary Examiner* — Syed Zaidi
(74) *Attorney, Agent, or Firm* — Young & Thompson

(57) ABSTRACT

Disclosed is a method for determining identification information on a user of a user terminal including a subscription of a second network, wherein the user terminal is requesting access to a first network. In the method an access request message is received from an entity controlling at least pertly the access to the first network and an identification request message is delivered to the user terminal. The user terminal is configured to return an indication of identification and if the indication is positive, pre-agreed piece of information is retrieved from a location accessible to the server. The pre-agreed piece of information is delivered to the entity controlling the access to the first network in order to provide an access to the first network. Also disclosed is a server, a user terminal and a computer program product.

19 Claims, 3 Drawing Sheets

(56) References Cited

U.S. PATENT DOCUMENTS

| | | | |
|---|---|---|---|
| 2009/0158387 A1* | 6/2009 | Huang | H04L 12/24 726/1 |
| 2010/0202351 A1* | 8/2010 | Xi | H04L 29/12188 370/328 |
| 2015/0043430 A1* | 2/2015 | Garcia Martin | H04L 61/157 370/328 |

FOREIGN PATENT DOCUMENTS

| | | |
|---|---|---|
| WO | 0054457 A1 | 9/2000 |
| WO | 0117310 A1 | 3/2001 |

* cited by examiner

NETWORK AUTHENTICATION

TECHNICAL FIELD

The invention concerns in general the technical field of network authentication. Especially the invention concerns utilization of information relating to a subscription of a telecommunications network for authentication to another service.

BACKGROUND OF THE INVENTION

The growth in a utilization of wireless local area networks (WLAN) has happened rapidly. One reason for this is that terminal devices of today are equipped with WLAN modems and thus capable of arranging the communication over the WLAN networks. This, in turn, has increased the availability of public WLAN networks in different location. The WLAN networks are accessible either for a charge or for free.

A challenge with the free WLAN networks is that there is typically no any kind authentication required. In other words, the network provider is not aware of parties who are using the network. However, there may be need to identify the users for example in situations in which the network is utilized for illegal purposes. The requirement for identifying the users of the WLAN network may be required by authorities either currently or in the future in at least some countries.

Some known methods for authentication, which are also applicable for free WLAN networks, exist. First known method is based on a combination of a username and password. The problem with such a solution is that this requires a way to deliver the credentials to users. This is typically arranged by requesting a registration of users through a registration process. This is slow and frustrating process for users, especially when there is need to access multiple free networks. A second known method is based on a use of EAP-SIM (Extensible Authentication Protocol for GSM Subscriber Identity Module) or EAP-AKA (Extensible Authentication Protocol for UMTS Authentication and Key Agreement) mechanisms. EAP-SIM is used for authentication and session key distribution using the Subscriber Identity Module, wherein the communication between the SIM card and the Authentication Centre (AuC) replaces the need for a pre-established password. EAP-AKA, in turn, is a mechanism for authentication and session key distribution using the UMTS Subscriber Identity Module (USIM), which also provides a corresponding way to get rid of pre-established passwords as in EAP-SIM. The problem with EAP based solutions, especially with EAP-SIM, EAP-AKA and EAP-AKA', is that they are telecom operator related as the SIM and USIM are delivered by operators. Thus, they cannot be used in other operators' networks, since the required MAP operation for authentication is firewalled between the operators. Thus, the WLAN network provider shall make agreements to all telecom operators in order to offer the authentication for all possible users. In practice, this is not feasible.

Concluding above, there is clear need to create an easy to use authentication mechanism to be used in context of an accessing a certain service, such as utilization of a short-range wireless communication network.

SUMMARY OF THE INVENTION

An objective of the invention is to present a method, a server, a user terminal and a computer program product for determining identification information for accessing a service. Another objective of the invention is that the method, the server, the user terminal and the computer program product for determining identification information utilize telecommunication network subscription related information for accessing to other service.

The objects of the invention are reached by a method, a server, a user terminal and a computer program product as defined by the respective independent claims.

According to a first aspect, a method for determining identification information on a user of a user terminal comprising a subscription of a second network, wherein the user terminal is requesting access to a first network, is provided. The method comprises steps of receiving, in a server, an access request message from an entity controlling at least partly the access to the first network; determining, from the access request message, information relating to the subscription; composing and delivering an identification request message from the server to the user terminal, the destination address of the user terminal is determined at least partly on the basis of the information relating to the subscription; receiving, from the user terminal, an indication of a successful identification of the user of the user terminal through an interaction of the user and the user terminal; retrieving, in response to the receipt of the indication, a pre-agreed at least one piece of information on the user of the user terminal from a location accessible to the server; and composing and delivering the pre-agreed at least one piece of information on the user of the user terminal to the entity controlling at least partly the access to the first network.

The step of determining of information relating to the subscription may comprise a determination of MSISDN number from the access request message for the destination address of the user terminal.

The step of determining of information relating to the subscription may comprise a determination of MSISDN number for the destination address of the user terminal by inquiring it from a pre-determined location accessible by the server on the basis of the information relating to the subscription determined from the access request message.

The step of composing of the identification request message in the server may comprise an input of an indication initiating a digital signing of at least part of the information in the identification message in the user terminal. The indication initiating a digital signing may comprise an authentication digest received with the access request message. The step of receiving the indication of the successful identification of the user may comprise a step of causing the server to determine the digitally signed authentication digest from the confirmation message and to retrieve at least one piece of information from a database accessible by the server on the basis of the digitally signed authentication digest. The pre-agreed at least one piece of information in the step of composing and delivering may comprise the digitally signed authentication digest and the user certificate.

According to a second aspect, a server for determining identification information on a user of a user terminal comprising a subscription of a second network, wherein the user terminal is requesting access to a first network, is provided. The server comprises a processing unit, a memory unit storing portions of computer program code, wherein the server by executing at least part of the portions of the computer program code with the processing unit is caused to: receive an access request message from an entity controlling at least partly the access to the first network; determine, from the access request message, information relating to the subscription; compose and deliver an identification request message from the server to the user terminal, the destination address of the user terminal is determined at least partly on the basis of the information relating to the subscription; receive, from the user terminal, an indication of a successful identification of the user of the user terminal through an interaction of the user and the user terminal; retrieve, in response to the receipt of the indication, a pre-agreed at least one piece of information on the user of the user terminal from a location accessible to the server; and compose and deliver the pre-agreed at least one piece of information on the user of the user terminal to the entity controlling at least partly the access to the first network.

The server may be configured to determine MSISDN number from the access request message for the destination address of the user terminal.

The server may be configured to determine MSISDN number for the destination address of the user terminal by inquiring it from a pre-determined location accessible by the server on the basis of the information relating to the subscription determined from the access request message.

The server may be configured to input of an indication initiating a digital signing of at least part of the information in the identification message in the user terminal. The indication initiating a digital signing may comprise an authentication digest received with the access request message.

The server may be configured to determine the digitally signed authentication digest from the confirmation message and to retrieve at least one piece of information from a database accessible by the server on the basis of the digitally signed authentication digest. The server may further be configured to input the digitally signed authentication digest and the user certificate as the pre-agreed at least one piece of information in an identification information message.

According to a third aspect, a user terminal comprising a processing unit and a memory unit storing portions of computer program code, wherein the user terminal is equipped with a subscriber identity module comprising a secure element, is provided, wherein the user terminal by executing at least part of the portions of the computer program code with the processing unit is caused to: receive an identification request message from a server, the identification request message comprising an authentication digest; initiate an application residing in the subscriber identity module for accessing to the secure element of the subscriber identity module for requesting a digital signing of the authentication digest; request an access code from the user in response to the request of digital signing of the authentication digest; checking if the access code input by the user is correct; in response to the positive outcome of the checking sign digitally the authentication digest with a key residing in the secure element; and deliver the digitally signed authentication digest to the server.

According to a fourth aspect, a computer program product, stored on a computer readable medium, is provided which computer program product causes a server to implement the method steps as disclosed above, when executed by a processing unit of the server.

The exemplary embodiments of the invention presented in this patent application are not to be interpreted to pose limitations to the applicability of the appended claims. The verb "to comprise" is used in this patent application as an open limitation that does not exclude the existence of also un-recited features.

The features recited in depending claims are mutually freely combinable unless otherwise explicitly stated.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION

Figure 1:
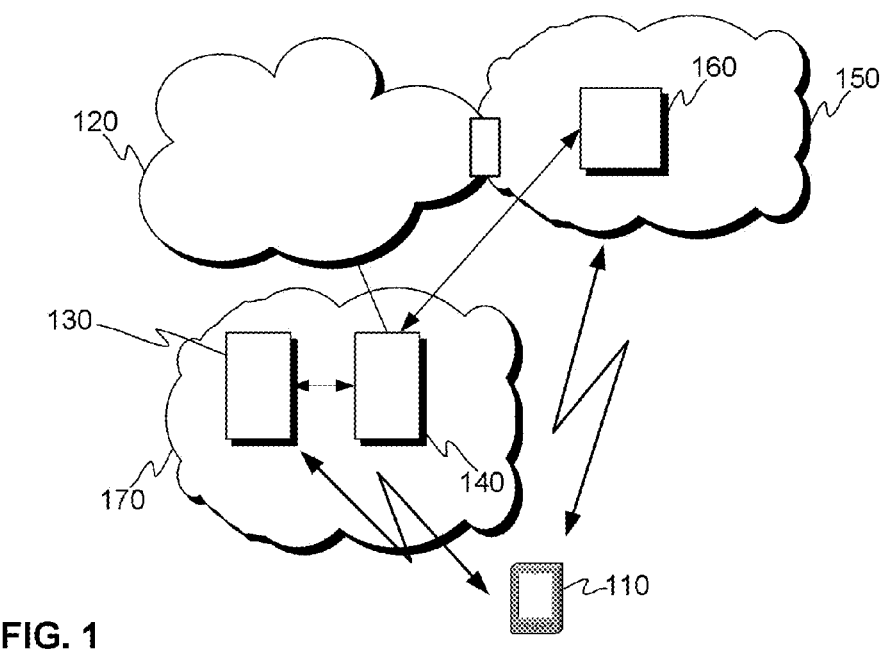
FIG. 1 illustrates an example of a network environment in which the invention may be implemented.

FIG. 1 illustrates the environment and entities participating in an implementation of the invention. A user terminal 110 is roaming within an area. The user terminal 110 enters a location where an access to a data network 120, such as Ethernet network like Internet, is provided through a network 170, such as a short-range wireless communication network. The short-range wireless communication network may be arranged with a wireless local area network (WLAN) complying e.g. one or more IEEE 802.11 standards. The wireless access may be implemented with an access point 130 comprising a wireless access means, such as a WLAN modem complying the WLAN standard in question, an interface to the data network 120, such as Internet, and additionally an interface to any other entities. The interface to the data network may be implemented either in a wired or wireless manner. An example of the access point 130 is a wireless local area network router. The user terminal 110 may communicate with the access point over the short range wireless technology. In an exemplified implementation according to FIG. 1 the access to the data network 120 is arranged through an access controller unit 140 which is coupled to the access point 130. In order to access the data network 120 the user of the user terminal 110 is arranged to be identified, which is one scope of the present invention. In order to perform the authentication the access controller unit 140 is arranged in communication with the access point 130. The access controller unit 140 is configured to manage the access procedure when a user terminal is accessing to the short-range wireless communication network and also to store user related information on users who are allowed to access the data network through access point 130 through an authentication mechanism as will be described. Additionally, an interface to a telecommunication network 150, such as a mobile communication network, is arranged to the access controller unit 140. More specifically, the access may be arranged to a server 160 residing in the telecommunications network 150, which server is at least configured to maintain subscription related information and perform identification related processes as will be described later. The user terminal 110 and the server 160 may also communicate together for implementing the invention. The access controller unit 140 may reside in the access point 130 or in the operator network, such as within the server 160, accessible by the access point 130. The access controller unit may the implemented with a hardware implementation, with a software implementation or with a combination of these. The server 160 may, in some implementation of the invention, locate in the access network 170 providing localized authentication services according to the present invention. The communication as will be described later may be arranged through the telecommunications network 150. In some implementations a part of the functionalities of the server 160 may be arranged in the access network 170 and part of the functionalities of the server 160 in the telecommunication network. The coordination of the operation in such an implementation is preferably arranged in either of these networks 150, 170. In an exemplified implementation as depicted in FIG. 1 the access to the data network is arranged through the access controller unit 140. In some other implementation the access may be arranged directly through the access point 130. In such a situation the access controller unit 140 is configured to communicate with the access point 130 in order to provide necessary instructions for granting the access to the data network through the access point 130.

Figure 2:
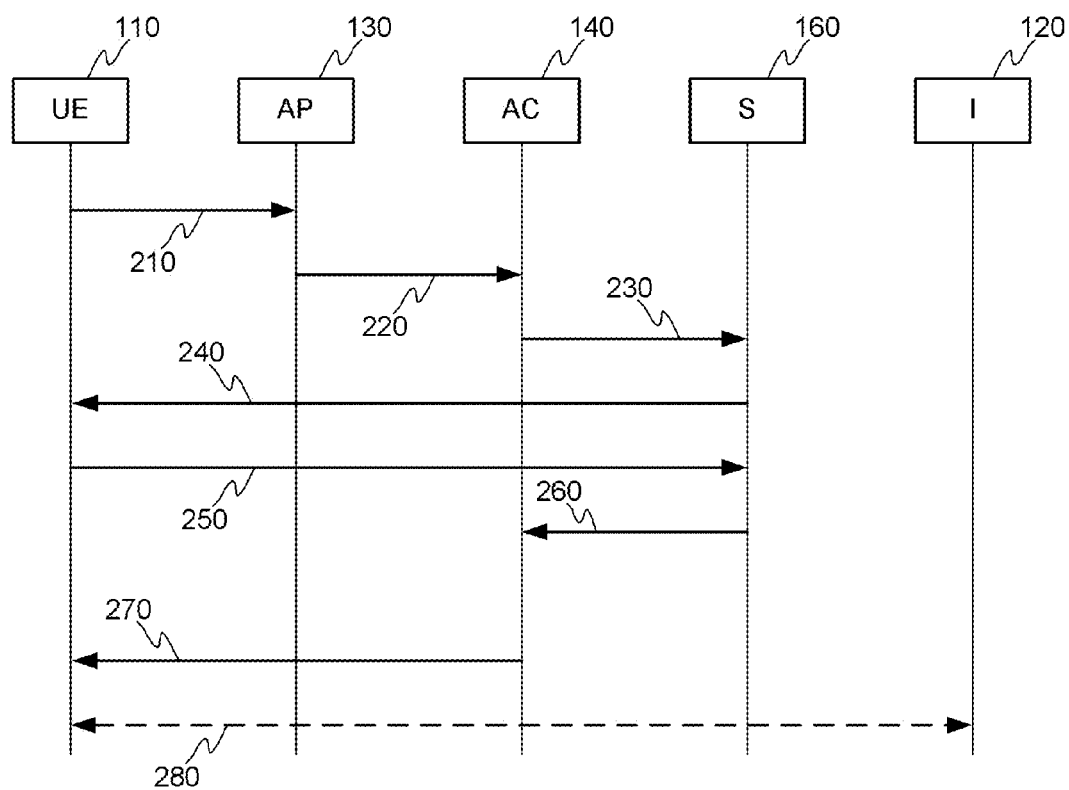
FIG. 2 illustrates an example of the method according to the invention through a message flow diagram.

Next an example of the present invention is described with a message flow as illustrated in FIG. 2. The access controller unit 140 is described as a separate entity in order to better illustrate its role in this context. A user terminal 110 has entered in an operational area of an access point 130, which access point 130 may provide access to a data network 120 for the user terminal 110 over a short-range communication network, such as WLAN. The user terminal 110 is equipped with necessary hardware and software implementations for detecting available short-range communication network, initiating an access in it and accessing it if allowed. This may be arranged either automatically or in response to a predefined action, such as a user action. More specifically, the user terminal may be configured to detect one or more available short-range communication networks by e.g. monitoring and detecting so called service set identifiers (SSID) broadcast by the access points 130. The SSID is an identifier attached to the header of packets sent over the short-range wireless communication network, which differentiates the networks from another. In response to the detection of one or more short-range wireless communication network the user terminal 110 may be configured, either automatically or in response to a predefined action, to prepare and send an access request 210 towards at least one of the access points 130 providing the short-range wireless communication network. According to an example of the invention subscription related identification information, by means of which the user can be identified by a service provider, such as telecom operator, providing the subscription, is added to the access request 210. The subscription related identification information may e.g. be a MSISDN (Mobile Station International Subscriber Directory Number), which uniquely identifies the subscription used with the user terminal 110 in question. The subscriber related identification information is not limited to MSISDN, but it may be any other by means of which the user, or the subscription, may be identified either directly or indirectly. Additionally, a network address, such as IP (Internet Protocol) address of a server maintaining the subscription related information and performing identification related processes, is configured to be added to the access request 210. The network address may be stored in a memory of the user terminal 110 and/or in the subscriber identity module residing in the user terminal 110 and/or in an application installed in the user terminal. Such an application may e.g. be the one which is configured to manage the accessing of the user terminal to a short-range wireless communication network. Furthermore, the network address may be encoded in a web page through which, according to some implementation of the invention, the access request may be delivered. The access point 130 is configured to, in response to a receipt of the access request 210, deliver 220 the access request 210 to an access controller unit 140, which, in turn, is configured to determine the network address in the access request 210 and deliver the access request 230 further to the server residing in the network address defined in the access request message. Thus, the access point 130 and the access controller unit 140 are configured so that a connection is configured to be established to the network address included in the access request in response to a receipt of the request from the user terminal 110. The server 160 receives the access request message 230 and is configured to determine the subscription related identification information, such as MSISDN information or any other pre-agreed identification information, from the access request message 230. The access request message 230 may also comprise some other information, such as a predetermined piece of information utilized in the authentication procedure according to the invention as will be described later. The some other information may be added to the access request message 230 by the access point 130 or access controller unit 140. An example of the some other information may be an authentication digest, such as a random number, which is delivered further through the access request message 230.

Next, the server 160 is configured to compose and send an identification request message 240 ("a challenge") to the user terminal carrying the subscription, whose identification information is determined. The identification request message 240 may e.g. be SMS, MMS or some other message, implemented e.g. over a signaling in the telecommunications network. Alternatively or in addition, it may be a message delivered through a data connection over a telecommunications network. If MSISDN is used as the identification information the server 160 may directly utilize the number as a destination address for the identification request message 240. Alternatively, if some other information is used for identifying the subscriber, a database may be arranged e.g. in the server 160 or accessible to the server, which comprises a transformation table to transform the identification information in use to a pre-stored MSISDN corresponding the identification information. Alternatively, the server 160 may be configured to determine the destination address of the subscription from the telecommunication network with the received identification information. For example, the server 160 may be arranged to initiate a query to one or more network elements in the telecommunications network, or in other network, for determining the destination address. As the user terminal 110 receives the identification request message 240 in a predetermined format it is configured to initiate an access request to the subscriber identity module. The subscriber identity module responds with a request of an access code from the user. The user is prompted to insert an access code through a user interface of the user terminal 110. The access code input by the user is configured to be confirmed by the subscriber identity module by comparing it with a correct access code stored in the subscriber identity module. Advantageously, the correct access code is stored in a so called secure element of the subscriber identity module. The secure element is a secure storage and execution environment in a smart card, such as in the subscriber identity module, which may store information, such as cryptographic keys and similar. If the access code input by the user is correct, a confirmation message 250 is composed and returned to the server 160 from the user terminal 110. If the access code input by the user is not correct, the access code may be re-prompted from the user for a predetermined number of times. Alternatively or in addition, a rejection message may be composed and delivered to the server, which may initiate an access cancellation procedure for preventing the user terminal 110 to access the short-range wireless communication network. In other words, the interaction of the user and the user terminal 110 relating to the access code inquiry and confirmation produces an indication on a successful identification of the user of the user terminal 110, when the access code given by the user is correct, which indication may be delivered to the server 160. Above it is disclosed that the access code to the data stored in the subscriber identity module is confirmed by the subscriber identity module. This can also be arranged in such a manner that a specific application installed and executed in the user terminal retrieves data, e.g. a correct access code, from the subscriber identity module and the application performs the comparison of the user input access code and the correct access code retrieved from the subscriber identity module.

In the following it is assumed that the access code given by the user is correct and a confirmation message is delivered to the server 160. The server 160 is configured to compose an identification information message 260 to the access controller unit 140, wherein the identification information message 260 comprises predetermined identification information on the user i.e. the owner of the subscription of the user terminal 110 inquired from the server 160, or any other entity, such as a database, accessible to the server. The inquiry may be performed on the basis of the original identification information on the subscriber, which is delivered from the access controller unit 140 to the server 160 in the message 230. Alternatively, the information to be used in the inquiry may be derived from the confirmation message 250, which carries at least some identification information on the subscriber. The predetermined identification information on the user in the identification information message 260 may be, but is not limited to, a name of a person owning the subscription, date of birth or social security number, or any similar to these or their combination. The access controller unit 140, in response to a receipt of the identification information message 260 with the predetermined information, is configured to store the identification information on the subscriber requesting the access to the short-range wireless communication network and provide an access to the user terminal to a data network through a short-range wireless communication network. The access controller unit 140 may compose and deliver an acknowledgement message 270 through the access point 130 to the user terminal 110 in order to inform the user on the granted data network access. As a result the user terminal 110 may start utilizing 280 the short range wireless connection, such as WLAN, for accessing to the data network 120, such as to the internet. In FIG. 2 and in the corresponding description it is described that the access to the data network is arranged through the access controller unit 140. In some other implementation the access may be arranged directly through the access point 130. In such a situation the access controller unit 140 is configured to communicate with the access point 130 in order to provide necessary instructions for granting the access to the data network through the access point 130.

In some other advantageous example of the invention the digital signature feature is utilized in the identification request message 240 and the procedure initiated from the receipt of the identification request message 240 in the user terminal 110. In such an example of the invention the predetermined format of the identification message is such that it comprises at least an authentication digest, such as a random number, which is intended to the secure element of the subscriber identity module for signing it digitally. The piece of information in the authentication digest may be received in the access request message 230 from either the access point 130 through the access controller unit 140 or from the access controller unit 140 adding the authentication digest in the access request message 230. In response to the receipt of the authentication digest, the access attempt to the secure element is configured to initiate an access code inquiry from the user. If the input code by the user is correct, the secure element of the subscriber identity module is configured to digitally sign the authentication digest with a private key, or similar, and the digitally signed authentication digest is returned to the server in the confirmation message 250. The receipt of the confirmation message 250 with the digitally signed authentication digest is configured to cause the server 160 to determine the digitally signed authentication digest from the confirmation message 250 and to retrieve at least a user certificate from a database accessible by the server 160. The retrieval of information may be based at least partly on the digitally signed authentication digest. In addition to the retrieval of the user certificate some other user related information may be retrieved from the database, such as a name of a person owning the subscription, date of birth or social security number, or any similar to these or their combination. Finally, depending on the implementation and required security some information is configured to be delivered to the access controller unit 140 in the identification information message 260. The information may be some piece or pieces of information retrieved from the database, such as user related information and/or user certificate. In some implementation the delivered information may also comprise the digitally signed authentication digest. The access controller unit 140 may be configured to determine from the received identification information message 260 the necessary pieces of information and in response to a positive outcome of the determination, i.e. receipt of pre-defined piece of identification information, the access controller 140 is configured to procedure grant an access to the network for example in a similar way as described earlier in this document.

According to some further example of the invention the user terminal 110 may be configured to identify from the service set identifier (SSID) that the short-range communication network supports a certain authentication mechanism i.e. inquiry to the server as described above. Thus, the access point 130 according to a present invention is advantageously arranged to send SSID, which indicates that the access point 130 supports a certain authentication mechanism. The indication may be inbound to information which is exchanged between the user terminal and the access point e.g. during the handshake procedure. The indication may e.g. be inserted to a specific data field, such as SS ID field which is length of 0 to 32 octets, within the SSID element, and the user terminal 110 may be configured to detect if the indication exists or not in the SSID information.

According to some example of the present invention the correct access code stored in the secure element of the subscriber identity module may be encrypted. The server may provide a key to decrypt the encrypted correct access code in connection with the identification request message 240. Alternatively or in addition, the encryption and decryption of the access code may be performed with a public and secret key pair in which the public key may be delivered from the server to the user terminal.

Figure 3:
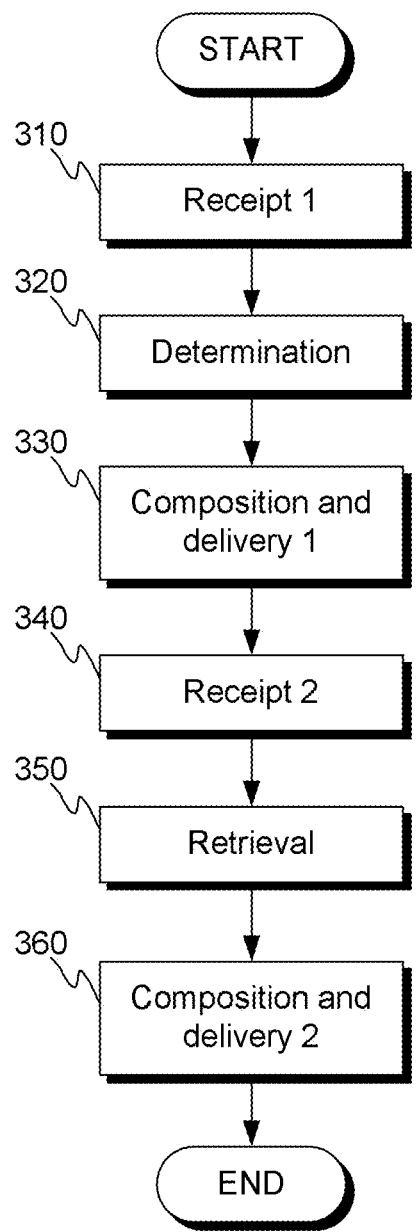
FIG. 3 illustrates an example of the method according to the invention.

Next an example of the present invention is described from the server 160 point of view by referring to FIG. 3. As described, the server 160, or any other entity accessible by the server, may at least be configured to maintain subscription related information and perform identification related processes. More specifically, the server 160 is configured to receive 310 an access request message 230 from a controlling element, such as from an access controller unit 140, and to determine 320 subscriber related information, such as MSISDN number, from the message. Alternatively or in addition, the server determines the MSISDN number on the basis of the determined subscriber related information in the access request message 230 from a transformation table stored in a location accessible by the server, as described earlier. In response to the determination of the MSISDN number the server is configured to compose and to deliver 330 an identification request message 240 to the user terminal 110 carrying the subscriber identity module of the determined MSISDN number. The identification request message comprises at least piece of information, which causes the user terminal to operate in a manner as already described i.e. initiation of interaction with the user. Additionally, the identification request message may comprise any other information, such as an authentication digest or cryptographic keys. Furthermore, the server 160 is configured to receive 340 a confirmation message 250 from the user terminal 110. The confirmation message 250 may comprise In response to the receipt of the confirmation message 250 the server is configured to initiate an inquiry to a pre-determined location, defined e.g. in the server 160, which stores user related information and thus retrieve 350 pre-agreed piece or pieces of information from the location, such as user certificate or any pre-agreed pieces of information. The location may e.g. be an internal or external database accessible for the server 160 storing the pre-agreed information. Next, as the server comprises the information as needed it is configured to compose 360 an identification information message 260 and to deliver 360 it to the access controller unit 140. The identification information message 260, and any other message according to the procedure of the invention, may comprise any additional information for example for management purposes in order to maintain information on the operations, which are performed and which are still under work.

In the exemplified description of the method it is mainly referred that it is the server, which is configured to determine, i.e. map, the MSISDN number from any of the possible user IDs received in the access request message. In some implementation it is possible to arrange so that a network element, such as the access control unit, residing under a management of the service provider of the network into which the user terminal wants to access may perform the mapping. Naturally, this requires that the service provider either maintains or has access to such information.

Figure 4:
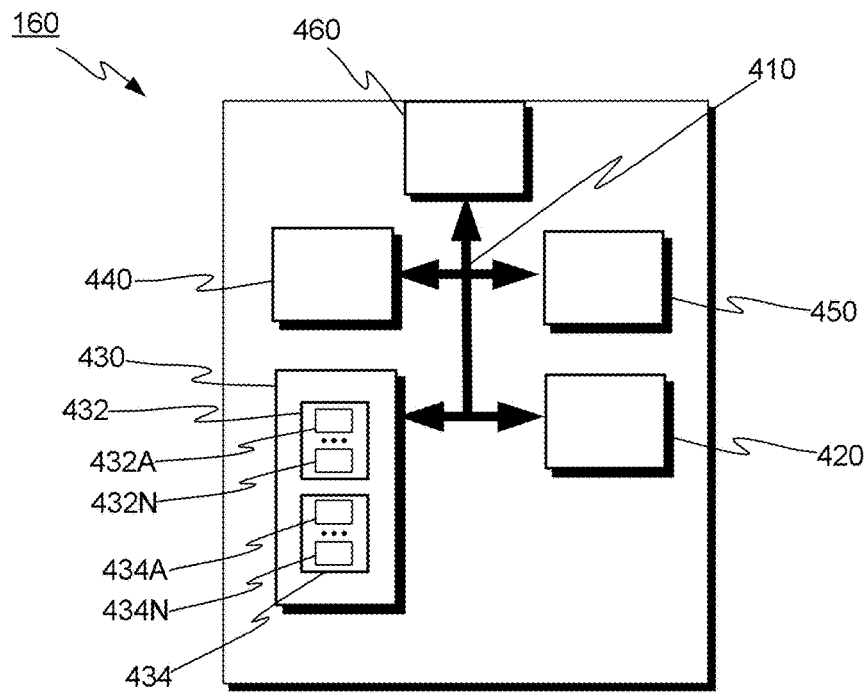
FIG. 4 illustrates an example of the server according to the invention.

FIG. 4 illustrates an example of a server, which is configured to implement the method as described above. The server 400 comprises, for example, a bus 410, a processor 420, a memory 430, input means 440, output means 450, and a communication interface 460. The bus 410 may include means or methods that enable communication among the elements of the server 400. The term 'server' shall be understood to cover any computing device comprising necessary hardware and computer program code stored in a memory, which may be configured to implement the method as described.

The processor 420 may comprise one or more conventional processors, one or more microprocessors, or one or more processing logics, or any combination of these, that interprets and executes instructions defined by portions of computer program code. The memory 430 may comprise a random access memory (RAM) 432 and/or a read only memory (ROM) 434. The RAM 432 may store information and instructions in a form of portions of computer program code 432A-432N for execution by the processor 420. The ROM 434 may include a conventional ROM device or another type of a static storage device that is configured to store static information and instructions in a form of portions of computer program code 434A-434N for use by the processor 420. The RAM 432 and ROM 434 may be implemented with one or more corresponding memory elements.

The input means 440 may comprise a conventional mechanism that permits inputting information to the server 160, such as a keyboard, a mouse, a pen, a touch screen, voice recognition and/or biometric mechanisms, CD/DVD/Blue-ray drive etc. The output means 450 may comprise a conventional mechanism that outputs information, including a display, a printer, a speaker, etc. The input and output means are not necessarily implemented into the server 160, but may be coupled to the server 160 with some known interfaces either wirelessly or in a wired manner when needed. In some examples of the invention the server does not comprise any input means 440 or output means 450 as the server operates as a standalone entity, which is controlled externally through the communication interface 460.

The communication interface 460 may enable the server 160 to communicate with other elements and/or servers, but also with networks, as well as with client terminals either directly or indirectly.

The server 160 may perform the operations as described above in response to the processor 420 executing at least one instruction defined in portions of computer program code contained in the computer-readable medium, such as memory. A computer-readable medium may be defined as a physical or logical memory device. The software instructions may be read into the memory from another computer-readable medium, such as a data storage device, or from another device via the communication interface 460. The software instructions may cause the processor 420 to perform method steps and processes as described and thus to enable the operation of the server 160 according to an example of the invention.

As said, FIG. 4 illustrates an example of the server 160 according to the invention. The elements as disclosed in FIG. 4 do not necessarily exist in all implementations of the server 160. For example, the server 160 may not comprise input means 440 and output means 450, but the server 160 may be accessed through the communication interface 460 with applicable devices and servers. As well, the number and type of memories may vary. Further, the amount of portions of computer program code may depend on the implementation.

Figure 5:
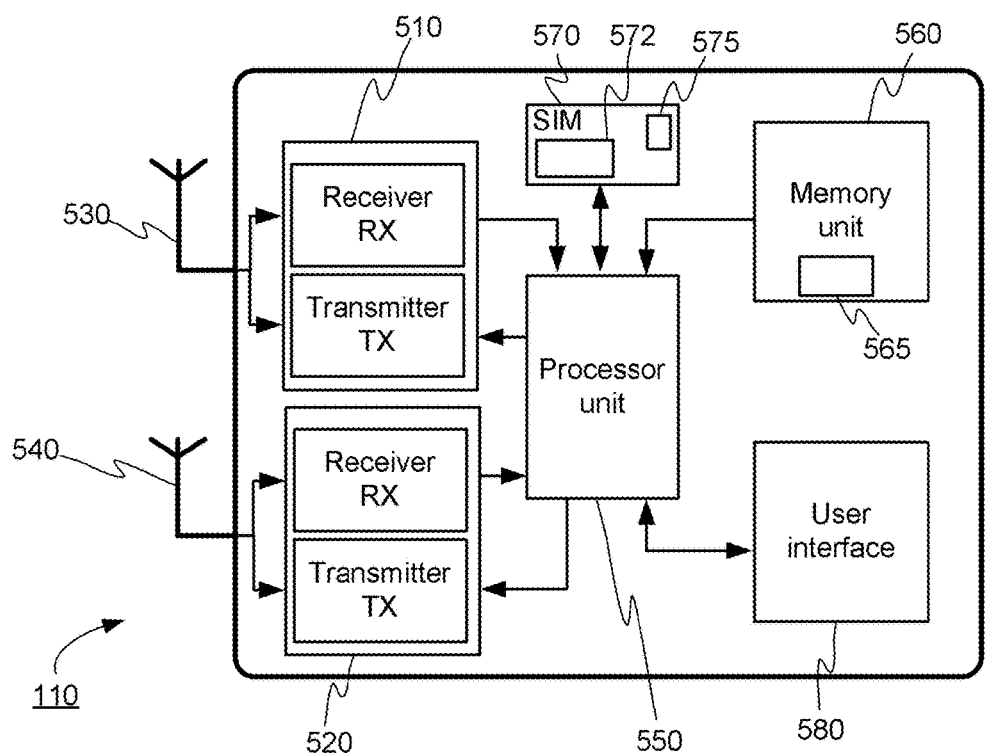
FIG. 5 illustrates an example of the user terminal according to the invention.

FIG. 5 illustrates a user terminal according to an example of the invention. The user terminal 110 is configured to access the telecommunications network 150 complying a known telecommunication technology, such as GSM or UMTS for example. Additionally, the user terminal 110 is configured to access a short-range wireless communication network, such as WLAN. In order to enable the accesses the user terminal is equipped with corresponding hardware and software implementations, such as GSM/UMTS modem 510 and WLAN modem 520, which provide interfaces to the corresponding networks. The modems 510, 520 typically comprise a transmitter and receiver parts as illustrated in FIG. 5 into which applicable antennas 530, 540 are coupled to. Additionally, the user terminal 110 comprises at least one processor unit 550 and one or more memory units 560. Moreover, the user terminal 110 is equipped with a subscriber identity module (SIM) 570, which is typically a telecom operator provided smart card inserted in the user terminal with known manner. Alternatively or in addition, the functionalities of the smart card 570 may be implemented with a software solution, which is executed by the processor unit. The user terminal 110 also comprises a user interface 580, which enables the exchange of information between the user and the user terminal in a manner as described especially in the description of FIG. 2. The mentioned elements are arranged to communicate with each other under control of the processor unit 550. Moreover, the user terminal 110 may comprise an application 565 according to some example of the invention, which is arranged to participate in the operation of the present invention by executing the application with the processor unit 550 of the user terminal 110. The application is implemented with computer program code, which application 565 may be stored in the memory unit of the user terminal 110. The application is configured to cause the user terminal 110, when the application is executed by the processor unit 550, to detect available short-range wireless communication networks and identify, on the basis of the network identifier if the network in question supports the authentication method as described. The application may prompt the user to input the MSISDN through the user interface and send the information to the access point providing the short-range wireless communication network. Alternatively, the application may be implemented so that it automatically, e.g. in response to a detection of a short-range wireless communication network, inquires the MSISDN, or some other applicable subscription identifier, from subscriber identity module and prompts user to send it, or even automatically sends it to the access point. A further implementation may be that a web page in a predetermined format is delivered to the user terminal (e.g. into a browser residing in the user terminal), when the data network access is requested. The web page may e.g. be such that it requests an input of information, such as MSISDN number or some other identification information on the user. Furthermore, the user terminal 110 may comprise an access to another application 575 residing in the subscriber identity module 570. The application 575 when executed in cooperation of the processor unit of the user terminal 110 is configured to detect a received identification request message 240 in the user terminal and to initiate accessing to the secure element 572 of the subscriber identity module 570, which causes an access code request from the user as described above. When the user inputs the access code, the application 575 is configured to confirm the input access code and if it is correct, the application 575 is configured to instruct the application 565 residing in the user terminal 110 to compose a confirmation message 250 and return it to the server. Additionally, the application 565 may be configured to monitor the short-range wireless communication connection, when it is established. It may also be arranged to store information, such as SSID information, on the networks in which the authentication mechanism as described is used for the user. In such a manner the user may find out the information afterwards if needed. Worthwhile to mention is that the FIG. 5 does not necessarily comprise all elements needed for a user terminal, but only those which may have relevance in describing and understanding the present invention.

In the description of advantageous examples of the invention above it is mainly described a situation in which the user terminal requesting the access to the short-range wireless communication network is the same as the one participating in the authentication procedure. However, the present invention is not limited thereto. In some implementation the user terminal requesting the access to the network may be different than the one participating to the authentication process. This may be implemented so that the user terminal requesting access provides information on the other user terminal, which shall be utilized in the authentication. The information on the other user terminal may also be inserted to an application residing in the user terminal requesting the access, which piece of information is automatically included in the access request. For example, the user of the user terminal requesting the network access may input a destination address, such as MSISDN number, of the terminal, which is a preferred entity for the authentication. In such a case the server according to the present invention is configured to initiate the delivery and to deliver the identification request message 240 into the other user terminal. The type of the user terminal requesting access to the network is not limited anyhow, but may for example be a laptop computer, tablet, mobile terminal without subscriber identity module, smart TV and so on as long as the device comprises necessary equipment for accessing a data network through the network into which the access is requested. The other user terminal to be utilized in the authentication is preferably such that it comprises the subscriber identity module, or similar data structure, which can be utilized according to the present invention in the authentication.

In the description it is described that the service requested by the user terminal is an access to a network. The invention is not, as such, limited only to such service request. The service request may relate to any other service in which the authentication may be arranged in the same way as described herein. Naturally, the messages as described in the context of requesting access to a network shall be adjusted so that a service in question may be requested by the user terminal.

In the description above it is disclosed communication to and from the server 160. However, the description does not cover any detailed description on the telecommunications network in which the server is residing. The telecommunications network comprises the well-known network elements and entities, which enable the communication between the elements in the network and with any external network or element to the telecommunications network. Thus, they are not described in more detailed manner herein.

The description above mainly refers to a situation in which the subscriber, i.e. the user of the user terminal, inquires an access to a short-range wireless communication network, The target network for the access may also be any other network than a short-range wireless communication network, such as a fixed network, which may be available to the user if the authentication is successful in a manner as described.

Some advantageous embodiments according to the invention were described above. The invention is not limited to the embodiments described. The inventive idea can be applied in numerous ways within the scope defined by the claims attached hereto.

We claim:

1. A method for determining identification information on a user of a user terminal (110) comprising a subscription of a second network, wherein the user terminal is configured to request access to a first network, the method comprising:
receiving, in a server, an access request message from an entity controlling at least partly the access to the first network,
determining, from the access request message, information relating to the subscription,
composing and delivering an identification request message from the server to the user terminal, the destination address of the user terminal is determined at least partly on the basis of the information relating to the subscription,
receiving, from the user terminal, an indication of a successful identification of the user of the user terminal through an interaction of the user and the user terminal,
retrieving, in response to the receipt of the indication, a pre-agreed at least one piece of information on the user of the user terminal from a location accessible to the server, and
composing and delivering the pre-agreed at least one piece of information on the user of the user terminal to the entity controlling at least partly the access to the first network.

2. The method of claim 1, wherein the step of determining of information relating to the subscription comprises a determination of a mobile station international subscriber directory number from the access request message for the destination address of the user terminal.

3. The method of claim 1, wherein the step of determining of information relating to the subscription comprises a determination of a mobile station international subscriber directory number for the destination address of the user terminal by inquiring it from a pre-determined location accessible by the server on the basis of the information relating to the subscription determined from the access request message.

4. The method of claim 1, wherein the step of composing of the identification request message in the server comprises an input of an indication initiating a digital signing of at least part of the information in the identification message in the user terminal.

5. The method of claim 4, wherein the indication initiating a digital signing comprises an authentication digest received with the access request message.

6. The method of claim 5, wherein the step of receiving the indication of the successful identification of the user comprises a step of causing the server to determine the digitally signed authentication digest from the confirmation message and to retrieve at least one piece of information from a database accessible by the server on the basis of the digitally signed authentication digest.

7. The method of claim 6, wherein the pre-agreed at least one piece of information in the step of composing and delivering comprises the digitally signed authentication digest and the user certificate.

8. A server for determining identification information on a user of a user terminal comprising a subscription of a second network, wherein the user terminal is requesting access to a first network, the server comprising:
a processing unit; and
a memory unit storing portions of computer program code,
wherein the server by executing at least part of the portions of the computer program code with the processing unit is caused to:
receive an access request message from an entity controlling at least partly the access to the first network,
determine, from the access request message, information relating to the subscription,
compose and deliver an identification request message from the server to the user terminal, the destination address of the user terminal is determined at least partly on the basis of the information relating to the subscription,
receive, from the user terminal, an indication of a successful identification of the user of the user terminal through an interaction of the user and the user terminal,
retrieve, in response to the receipt of the indication, a pre-agreed at least one piece of information on the user of the user terminal from a location accessible to the server, and
compose and deliver the pre-agreed at least one piece of information on the user of the user terminal to the entity controlling at least partly the access to the first network.

9. The server of claim 8, wherein the server is configured to determine a mobile station international subscriber directory number from the access request message for the destination address of the user terminal.

10. The server of claim 8, wherein the server is configured to determine a mobile station international subscriber directory number for the destination address of the user terminal by inquiring it from a pre-determined location accessible by the server on the basis of the information relating to the subscription determined from the access request message.

11. The server of claim 8, wherein the server is configured to input of an indication initiating a digital signing of at least part of the information in the identification message in the user terminal.

12. The server of claim 11, wherein the indication initiating a digital signing comprises an authentication digest received with the access request message.

13. The server of claim 8, wherein the server is configured to determine the digitally signed authentication digest from the confirmation message and to retrieve at least one piece of information from a database accessible by the server on the basis of the digitally signed authentication digest.

14. The server of claim 13, wherein the server is further configured to input the digitally signed authentication digest and the user certificate as the pre-agreed at least one piece of information in an identification information message.

15. A non-transitory computer readable medium having stored thereon a computer program product that, when executed by a processing unit of a server, causes the server to implement a method for determining identification information on a user of a user terminal (110) comprising a subscription of a second network, wherein the user terminal is configured to request access to a first network, the server implementing the steps of:
receiving, in the server, an access request message from an entity controlling at least partly the access to the first network,
determining, from the access request message, information relating to the subscription,
composing and delivering an identification request message from the server to the user terminal, the destination address of the user terminal is determined at least partly on the basis of the information relating to the subscription, receiving, from the user terminal, an indication of a successful identification of the user of the user terminal through an interaction of the user and the user terminal, retrieving, in response to the receipt of the indication, a pre-agreed at least one piece of information on the user of the user terminal from a location accessible to the server, and composing and delivering the pre-agreed at least one piece of information on the user of the user terminal to the entity controlling at least partly the access to the first network.

16. The non-transitory computer readable medium of claim 15, wherein in the step of determining of information relating to the subscription, the computer program product, when executed by the processing unit of the server, causes the server to make a determination of a mobile station international subscriber directory number from the access request message for the destination address of the user terminal.

17. The non-transitory computer readable medium of claim 15, wherein in the step of determining of information relating to the subscription, the computer program product, when executed by the processing unit of the server, causes the server to make a determination of information relating to the subscription comprises a determination of a mobile station international subscriber directory number for the destination address of the user terminal by inquiring it from a pre-determined location accessible by the server on the basis of the information relating to the subscription determined from the access request message.

18. The non-transitory computer readable medium of claim 15, wherein in the step of composing of the identification request message in the server comprises, the computer program product, when executed by the processing unit of the server, causes the server to accept an input of an indication initiating a digital signing of at least part of the information in the identification message in the user terminal.

19. The non-transitory computer readable medium of claim 18, wherein in the step of composing of the identification request message in the server comprises, the computer program product, when executed by the processing unit of the server, causes the server to receive, with the access request message, an authentication digest as part of the indication initiating the digital signing.

* * * * *